United States Patent [19]

Edmaier et al.

[11] 4,146,261

[45] Mar. 27, 1979

[54] CLAMPING ARRANGEMENT

[75] Inventors: Franz Edmaier, Markdorf; Günther Beck; Peter Küster, both of Friedrichshafen, all of Fed. Rep. of Germany

[73] Assignee: Motoren- und Turbinen-Union Friedrichshafen GmbH, Fed. Rep. of Germany

[21] Appl. No.: 876,107

[22] Filed: Feb. 8, 1978

[30] Foreign Application Priority Data

Feb. 12, 1977 [DE] Fed. Rep. of Germany ....... 2706105

[51] Int. Cl.² .............................................. F16L 23/00
[52] U.S. Cl. ..................................... 285/364; 285/370
[58] Field of Search ............... 285/364, 366, 365, 406, 285/407, 410, 411, 370, 371, 397, 398

[56] References Cited

U.S. PATENT DOCUMENTS

| 180,781 | 8/1876 | Morgan | 285/406 X |
|---|---|---|---|
| 1,016,878 | 2/1912 | Felker | 285/406 |
| 2,353,572 | 7/1944 | Kuster et al. | 285/411 X |
| 2,814,508 | 11/1957 | Seamark | 285/371 X |
| 3,044,657 | 7/1962 | Horton | 285/398 X |
| 4,035,006 | 7/1977 | Isoyama | 285/364 |

FOREIGN PATENT DOCUMENTS 784158   10/1957   United Kingdom ..................... 285/365

*Primary Examiner*—Thomas F. Callaghan
*Attorney, Agent, or Firm*—Craig & Antonelli

[57] ABSTRACT

A clamping arrangement for clamping connecting flanges of two machine housings which includes a number of tightening claws or clamping shoes distributed about a circumference of the connecting flanges for clamping the connecting flanges together. Tightening surfaces are provided on the tightening claws or clamping shoes and the connecting flanges for drawing the connecting flanges together. At least one radially extending bolt is provided for each of the tightening claws or clamping shoes with the bolt passing through an associated tightening claw or clamping shoe.

8 Claims, 4 Drawing Figures

CLAMPING ARRANGEMENT

The present invention relates to a fastening or tightening arrangement and, more particularly, to an arrangement for clamping connecting flanges of two machine housings.

It has been proposed to employ a flanged connection for securing or fastening two elements such as machine housings together with the flanges of the machine housings being clamped together by bolts or screws disposed at approximately regular intervals about the circumference to the flanges.

While the above-noted proposed connection has been adequate, one disadvantage resides in the fact that the connecting of the two machine housings in such a manner requires a relatively great expenditure of time to tighten and loosen the bolts or screws.

A further disadvantage of such proposed connection resides in the fact that it is often difficult to obtain the necessary space for installing the bolts or screws in the axial direction, and access to the bolts or screws is very difficult by virtue of additional assemblies normally mounted on the machines such as, for example, pumps, filters, connecting lines, or the like.

The aim underlying the present invention essentially resides in providing a flanged connection for machine housings which permits not only a rapid and simple assembly and disassembly of the two machine housings, but also provides a connection which is able to withstand considerable stresses of the type experienced in, for example, vehicle constructions.

According to advantageous features of the present invention, bracket-shaped tightening claws or clamping shoes are distributed about a circumference of the connecting flanges of the machine housing with the tightening claws or clamping shoes clamping together the two connecting flanges by clamping surfaces disposed on the tightening claws or clamping shoes cooperating with matching surfaces appropriately provided on the connecting flanges with lag bolts or screws, disposed radially with respect to the connecting flanges, passing or extending through the tightening claws or clamping shoes.

By virtue of the above-noted features of the present invention, a space is no longer required in an axial direction for installation and removal of bolts or screws, but rather the machine housing may coincide with the flange over large areas of the flange circumference and may be brought into contact with the flange with the locations of the tightening claws or clamping shoes with a slight space remaining. Generally, three tightening claws or clamping shoes will provide for sufficient reliable clamping of the machine housing so that the flange connection can be assembled or disassembled by tightening or loosening only three lag bolts or screws.

For clamping together machine housings made of a light alloy, according to a further advantageous feature of the present invention, a ring is disposed between the two connecting flanges with the ring, made of a material having high strength characteristics or parameters, serving to center the two machine housings with respect to one another. The ring is provided with a threaded portion for threadably receiving the lag bolts or screws. Moreover, the ring, fastened to one of the two flanges of the two machine housings, also allows mounting lugs to be provided easily for connecting the machine housing to the ring.

According to a still further feature of the present invention, the clamping or tightening surfaces of the tightening claws or clamping shoes and the corresponding or matching surfaces provided on the connecting flanges are formed by partial surface areas with identical internal and external tapers. By virtue of this construction, the surfaces to be clamped together may be made in a simple fashion and it is ensured that the tightening claws or clamping shoes will be reliably seated in the assembled condition.

In accordance with an additional advantageous feature of the present invention, a washer is fastened to the shaft of each lag bolt or screw, which washer serves to force the tightening claws or clamping shoes away from the connecting flanges with two additional bolts or screws, disposed in threaded bores of the tightening claws or clamping shoes, being guided in corresponding bores provided in the ring or in a connecting flange. Bushings are disposed in one end of the bores and cooperate with the shank portion of the additional bolts or screws so as to function as stops or abutment means limiting the axial displacement of the tightening claws or clamping shoes when the lag bolt or screw is unfastened or loosened. By virtue of this constructional feature, the tightening claws or clamping shoes are allowed to remain connected to one of the machine housings when the housings are in a disassembled state with the tightening claws or clamping shoes being in a position such that the two flanges fit together and can be squeezed together only when the lag bolts or screws are tightened. In this manner, even when there are a large number of additional parts and lines, a simple tool, for example, a long socket wrench, can be utilized for assembling the two machine housings.

Accordingly, it is an object of the present invention to provide a clamping arrangement which avoids by simple means the shortcomings and disadvantages encountered in the prior art.

Another object of the present invention resides in providing a clamping arrangement which permits a rapid and simple assembly and disassembly of two machine housings.

An additional object of the present invention resides in providing a clamping arrangement which is capable of withstanding considerable stresses and forces while maintaining the machine housings in a tightened or clamped condition.

A further object of the present invention resides in providing a clamping arrangement which is simple in construction and, therefore, inexpensive to manufacture.

Yet another object of the present invention resides in providing a clamping arrangement which functions reliably under all operating conditions.

These and other objects, features and advantages of the present invention will become more apparent from the following description when taken in connection with the accompanying drawings which show, for the purposes of illustration only, one embodiment in accordance with the present invention, and wherein.

Figure 1:
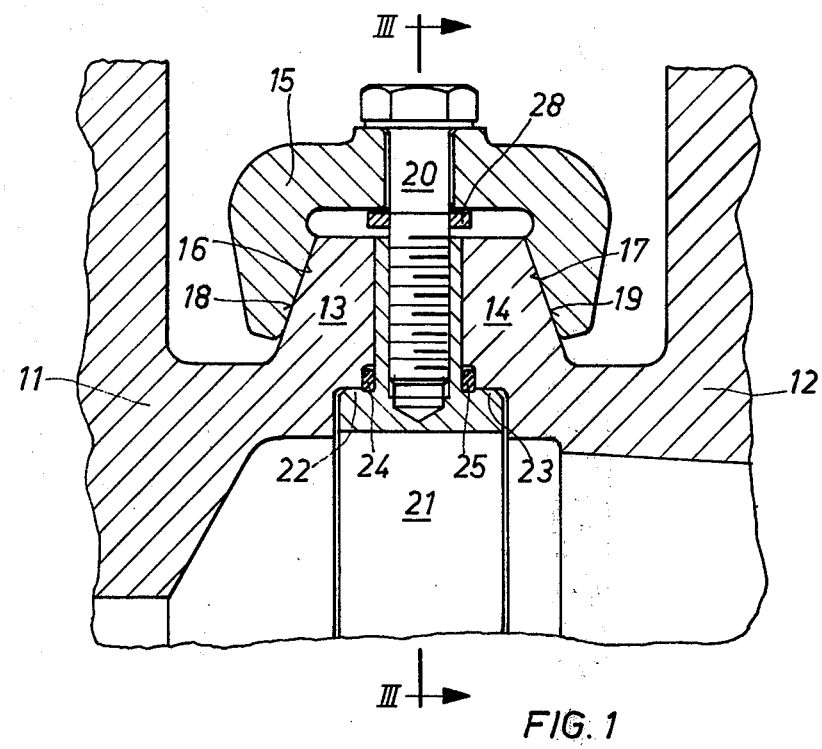
FIG. 1 is a cross-sectional view taken along the line I—I of FIG. 3 through a clamping arrangement in accordance with the present invention.

Referring now to the drawings wherein like reference numerals are used throughout the various views to designate like parts and, more particularly to FIG. 1, according to this figure, two machine housings 11, 12 are clamped together by at least three tightening claws or clamping shoes 15, only one of which is shown in the drawings, with the tightening claws or clamping shoes 15 being bracket-shaped and being distributed about the circumference of two connecting flanges 13, 14 of the machine housings 11, 12. Each of the tightening claws or clamping shoes 15 act on clamping or tensioning inner cone-shaped surfaces 16, 17 disposed on the tightening claws or clamping shoes 15, which clamping or tensioning inner cone-shaped surfaces 16, 17 cooperate with appropriately designated matching clamping or tensioning outer cone-shaped surfaces 18, 19 provided on the connecting flanges 13, 14. Since the tightening claws or clamping shoes 15 do not extend over the entire circumference of the flanges 13, 14, the clamping or tensioning surfaces 16, 17 or 18, 19 consist of partial face areas of the inner and outer cone-shaped surfaces. The tightening claws or clamping shoes 15 are tightened or secured by lag bolts or screws 20. The lag bolts or screws 20 are radially disposed with respect to the connecting flanges 13, 14, and each lag bolt or screw 20 is guided through a respective tightening claw or clamping shoe 15.

Figure 3:
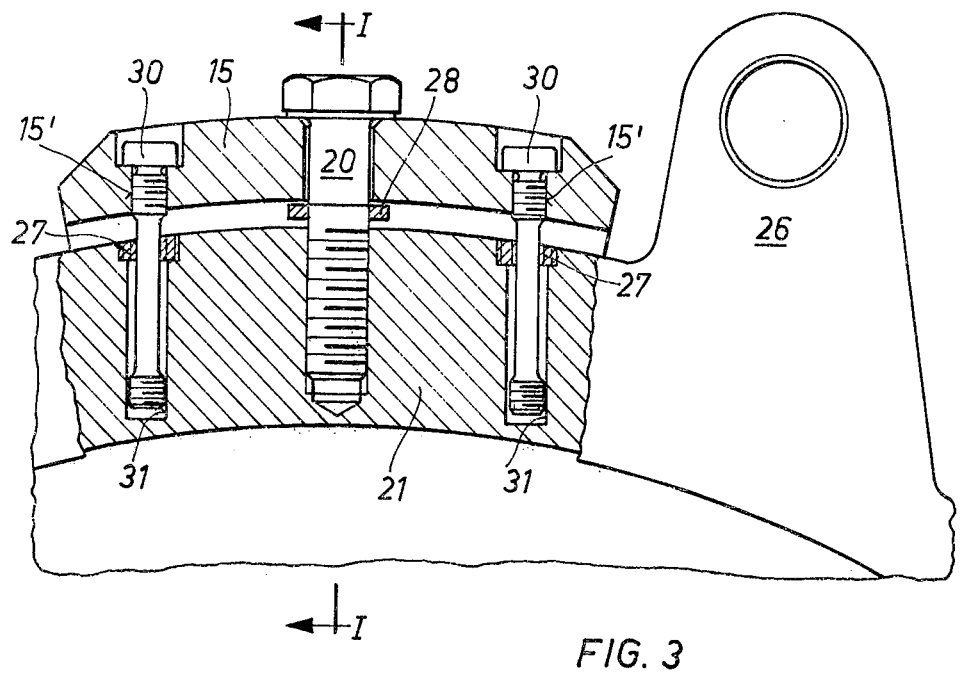
FIG. 3 is a cross-sectional view taken along the line III—III of FIG. 1 with the clamping arrangement of the present invention in a clamped or tightened position.
Figure 4:
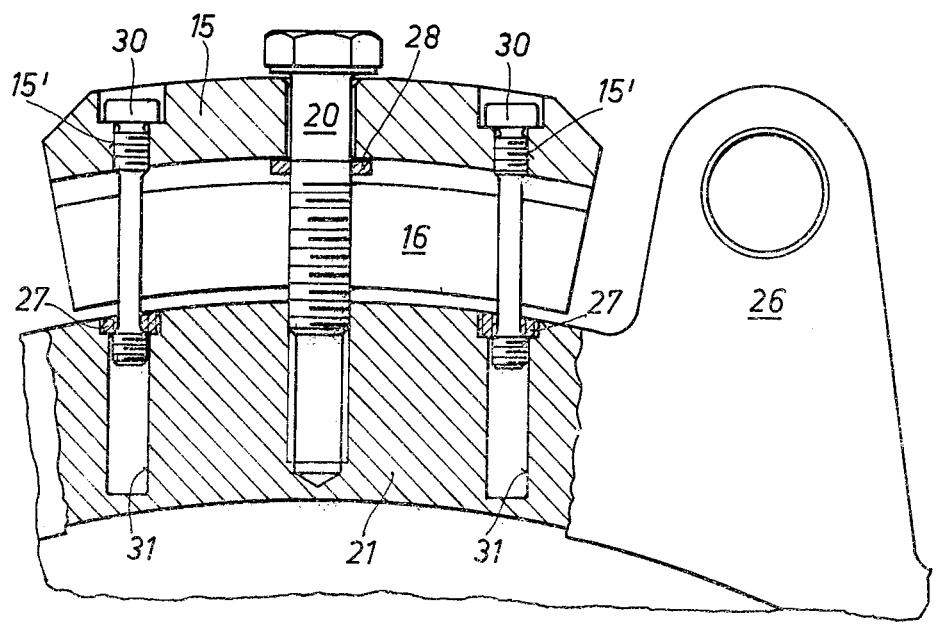
FIG. 4 is a cross-sectional view similar to FIG. 3 illustrating the clamping arrangement of the present invention in a raised or loosened position.

A ring 21 provided with centering devices 22, 23 and sealing rings 24, 25 is disposed between the two connecting flanges 13, 14. The ring 21 is provided with radially extending threaded bores for threadably receiving the lag bolts or screws 20 and with a mounting lug or suspension eye 26 (FIGS. 3 and 4). A washer 28 is mounted on each of the lag bolts or screws 20 and serves to push or urge the respective tightening claw or clamping shoe 15 away from the ring 21 and from flanges 13, 14 when the lag bolts or screws 20 are turned counter-clockwise.

Figure 2:
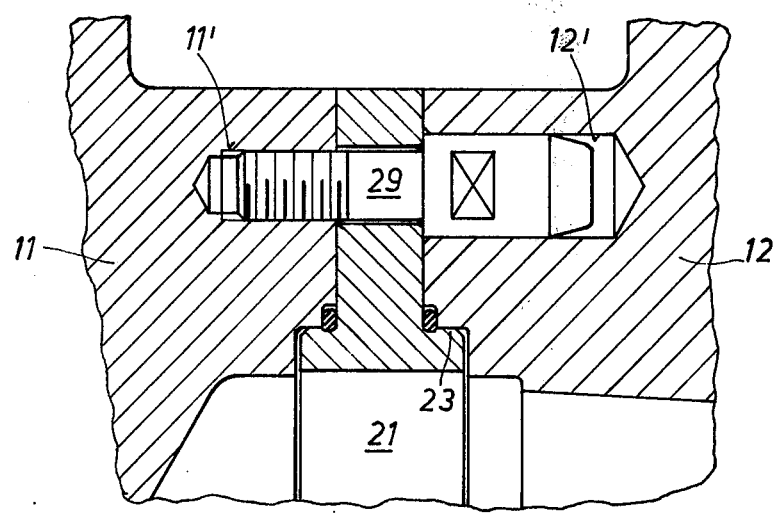
FIG. 2 is a cross-sectional view through the connecting flanges of two machine housings at another point along a circumference of the connecting flanges.

At least two centering bolts or screws 29, only one of which is shown in FIG. 2, are provided for permitting a pre-centering of the two machine housings 11, 12 prior to the clamping of the flanges 13, 14. For this purpose, two threaded bores 11' are provided at, for example, diametrically opposite positions of the machine housing 11 for threadably receiving the centering bolts or screws 29, thereby firmly fastening or securing the centering ring 21 to the housing 11 by means of the centering device 22. Corresponding bores 12' are provided in the housing 12 for slidably receiving the head portions of the respective bolts or screws 29. By virtue of the precentering function of the bolts or screws 29, when the two machine housings 11, 12 are fitted together, the position of the flanges 13, 14 with respect to one another is determined prior to the centering device 22 engaging. The centering device 22 is used only if the ring 21 is connected to the flange 13 with the screws 29 firmly bracing the ring 21 and the flange 13 together so that these parts remain permanently joined. During further assembly of the flanges 13, 14, the connection is effected merely by way of the centering bolts 29 and the centering device 23.

As apparent, the centering devices 22, 23 serve the purpose of exactly centering two parts such as, for example, the two flanges 13, 14 with respect to each other. The centering devices may, for example, include a collar at one housing part and a corresponding bore in the other housing part. During assembly of the housing parts, the collar would then be inserted into the bore by shifting one or both housings axially, thereby achieving an exact centering of the housing parts with respect to each other.

As shown most clearly in FIGS. 3 and 4, in addition to lag bolts or screws, two additional bolts or screws 30 may be provided which are firmly secured or fastened in two threaded bores 15' provided in the tightening claw or clamping shoe 15 at respective sides of the lag bolt or screw 20.

Bores 31 are provided in the centering ring 21 for receiving shanks or shafts of the bolts or screws 30 with the bores 31 having a length at least equal to the length of the shank or shaft of the respective bolts or screws 30. Bushings 27 are arranged at an upper end of each of the bores 31. The bushings are internally and externally threaded so as to permit the respective bushings 27 to be threadably secured at the upper end of the bores 31 and also threadably receive the bolts or screws 30. If no centering ring 21 is employed, the bores 31 may be arranged directly in the connecting flanges 13 or 14.

The threaded portion of each of the bolts or screws 30 is terminated or interrupted in a central portion of the shank or shaft so as to effectively form two spaced threaded portions at an upper and free end of the bolts or screws 30. As apparent from FIGS. 3 and 4, the free ends of the bolts or screws 30 are slidable within the bores 31.

As shown most clearly in FIG. 4, when the tightening claws or clamping shoes 15 are pushed or raised, by a loosening of the lag bolt or screw 20, the bushing 27 functions as a stop or abutment limiting the axial displacement of the tightening claws or clamping shoes 15. With the tightening claws or clamping shoes 15 in the position illustrated in FIG. 4, the two machine housings 11, 12 can be separated with the ring 21 and tightening claws or clamping shoes 15 remaining connected to the housing 11.

During assembly, after fitting together the pre-centering bolts or screws 29 and the centering device 23, only three lag bolts or screws 20 need to be tightened in order to pull three tightening claws or clamping shoes 15 together. The centering and connection of internal shafts are accomplished, as before, in a conventional manner using key shaft and splines or the like, whereby the assembly of the two machine housings is then complete.

While we have shown and described only one embodiment in accordance with the present invention, it is understood that the same is not limited thereto, but is susceptible of numerous changes and modifications as known to a person skilled in the art, and we therefor do not wish to be restricted to the details shown and described herein, but intend to cover all such changes and modifications as are encompassed by the scope of the appended claims.

We claim:

1. A clamping arrangement for clamping connecting flanges of two machine housings, the clamping arrangement comprising:
    a plurality of clamping shoe means distributed about a circumference of the connecting flanges for clamping the connecting flanges together, tightening surface means provided on the clamping shoe means and the connecting flanges for drawing the connecting flanges together, said tightening surface means being formed by partial surface areas with identical internal and external cooperating tapered surfaces, at least one radially extending bolt means provided for each of said clamping shoe means, said bolt means passing through an associated clamping shoe means, a ring means disposed between the machine housings for centering the machine housings with respect to one another, threaded bore means provided in said ring means for threadably receiving said bolt means, a washer means fastened to a shaft of each of said bolt means for forcing the clamping shoe means away from the connecting flanges, two additional bolt means provided at each clamping shoe means, said additional bolt means being disposed in threaded bores provided in the clamping shoe means, further bore means provided in the ring means for receiving said additional bolt means, and stop means in said further bore means for limiting an axial displacement of said clamping shoe means with respect to the connecting flanges.

2. An arrangement according to claim 4, wherein said stop means are threaded bushings disposed at upper ends of the further bore means.

3. An arrangement according to claim 2, wherein each of said additional bolt means includes a threading interrupted in a central area of a shank of the additional bolt means so as to form an upper and lower threaded portion.

4. A clamping arrangment for clamping connecting flanges of two machine housings, the clamping arrangement comprising:

a plurality of clamping shoe means distributed about a circumference of the connecting flanges for clamping the connecting flanges together, tightening surface means provided on the clamping shoe means and the connecting flanges for drawing the connecting flanges together, said tightening surface means are formed by partial surface areas with identical internal and external cooperating tapered surfaces, at least one radially extending bolt means provided for each of said clamping shoe means, said bolt means passing through an associated clamping shoe means, a ring means diposed between the machine housings for centering the machine housings with respect to one another, a washer means fastened to a shaft of each of said bolt means for forcing the clamping shoe means away from the connecting flanges, two additional bolt means provided at each clamping shoe means, said additional bolt means being disposed in threaded bores provided in the clamping shoe means, bore means provided in said ring means for receiving said additional bolt means, and stop means in said further bore means for limiting an axial displacement of said clamping shoe means with respect to the connecting flanges.

5. An arrangement according to claim 4, wherein each of said additional bolt means includes a threading interrupted in a central area of a shank of the additional bolt means so as to form an upper and lower threaded portion.

6. A clamping arrangement for clamping connecting flanges of two machine housings, the clamping arrangement comprising:

a plurality of clamping shoe means distributed about a circumference of the connecting flanges for clamping the connecting flanges together, tightening surface means provided on the clamping shoe means and the connecting flanges for drawing the connecting flanges together, at least one radially extending bolt means provided for each of said clamping shoe means, said bolt means passing through an associated clamping shoe means, a ring means disposed between the machine housings for centering the machine housings with respect to one another, a washer means fastened to a shaft of each of said bolt means for forcing the clamping shoe means away from the connecting flanges, two additional bolt means provided at each clamping shoe means, said additional bolt means being disposed in threaded bores provided in the clamping shoe means, bore means provided in the ring means for receiving said additional bolt means, and stop means in said further bore means for limiting an axial displacement of said clamping shoe means with respect to the connecting flanges.

7. An arrangement according to claim 6, wherein each of said clamping shoe means is bracket-shaped.

8. An arrangement according to claim 7, wherein the tightening surface means are formed by partial surface areas with identical internal and external cooperating tapered surfaces.

* * * * *